(12) United States Patent
Lichtenberg (10) Patent No.: US 6,584,649 B1
(45) Date of Patent: Jul. 1, 2003

(54) FAUCET COUPLING DEVICE

(76) Inventor: Karl V. Lichtenberg, 3458 Old Keystone Rd., Tarpon Springs, FL (US) 34689

( * ) Notice: Subject to any disclaimer, the term of this patent is extended or adjusted under 35 U.S.C. 154(b) by 131 days.

(21) Appl. No.: 09/709,197

(22) Filed: Nov. 10, 2000

(51) Int. Cl.[7] .................................................. E05B 1/00
(52) U.S. Cl. ........................ 16/441; 16/DIG. 24; 74/548
(58) Field of Search ........................ 16/441, DIG. 24, 16/DIG. 30; 251/291, 292; 292/347, 350, 351; 74/548, 553; D23/251

(56) References Cited

U.S. PATENT DOCUMENTS

| | | | |
|---|---|---|---|
| 2,013,578 A | * | 9/1935 | Pardieck ..................... 403/361 |
| 2,660,904 A | * | 12/1953 | Hilsinger, Jr. ................ 74/553 |
| 2,898,776 A | * | 8/1959 | Spencer ....................... 74/553 |
| D192,989 S | | 6/1962 | Young |
| 3,129,606 A | | 4/1964 | Harty, Jr. |
| 3,301,580 A | * | 1/1967 | Greitzer ................. 16/DIG. 30 |
| D207,940 S | | 6/1967 | Laguera et al. |
| 3,396,604 A | * | 8/1968 | Samuels et al. ............... 16/441 |
| 4,065,216 A | * | 12/1977 | Nelson .................. 16/DIG. 24 |
| 4,549,716 A | * | 10/1985 | Warren ........................ 74/548 |
| D289,676 S | | 5/1987 | Evans et al. |
| 4,716,922 A | * | 1/1988 | Camp ......................... 251/291 |
| 4,766,642 A | * | 8/1988 | Gaffney et al. ............... 16/441 |
| 4,876,766 A | | 10/1989 | Cohen |
| 5,082,023 A | | 1/1992 | D'Alayer de Costemore d'Arc |
| 5,741,003 A | * | 4/1998 | Segien, Jr. ................... 16/441 |
| 5,797,422 A | | 8/1998 | Tokarz |
| 6,029,692 A | * | 2/2000 | Barber ....................... 251/288 |
| 6,219,884 B1 | * | 4/2001 | Adriano ...................... 16/441 |

* cited by examiner

Primary Examiner—Anthony Knight
Assistant Examiner—Doug Hutton (57) ABSTRACT

A faucet coupling device for securing a faucet handle to any faucet shaft. The faucet coupling device includes a block member. The block member has a front surface, a back surface, a bottom surface, a top surface, a first side surface and a second side surface. The back surface has a bore extending therein. The front surface has an aperture extending therein and into the bore. The bore has a diameter greater than a diameter of the faucet shaft. The top surface has a first hole therein. The first hole extends into the bore and is orientated generally perpendicular to the bottom surface. At least one fastening means extends through the hole and removably fastens the block member to the faucet shaft. A handle member comprises a plate having a bottom side and a top side. The bottom side has a well extending therein. The well has a diameter adapted for extendably positioning the top surface of the block member therein. The plate has an opening therein extending through the top side and into the well. A securing means extends through the opening and into the aperture for removably securing the plate to the block member.

7 Claims, 12 Drawing Sheets

FAUCET COUPLING DEVICE

BACKGROUND OF THE INVENTION

1. Field of the Invention

The present invention relates to faucet handle coupling devices and more particularly pertains to a new faucet coupling device for securing a faucet handle to any faucet shaft.

2. Description of the Prior Art

The use of faucet handle coupling devices is known in the prior art. More specifically, faucet handle coupling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,876,766; U.S. Des. Pat. No. 192,989; U.S. Des. Pat. No. 207,940; U.S. Pat. No. 3,129,606; U.S. Pat. No. 5,082,023; U.S. Pat. No. 5,797,422; and U.S. Des. Pat. No. 289,676.

While these devices fulfill their respective, particular objectives and requirements, the aforementioned patents do not disclose a new faucet coupling device. The inventive device includes a block member. The block member has a front surface, a back surface, a bottom surface, a top surface, a first side surface and a second side surface. The back surface has a bore extending therein. The front surface has an aperture extending therein and into the bore. The bore has a diameter greater than a diameter of the faucet shaft. The top surface has a first hole therein. The first hole extends into the bore and is orientated generally perpendicular to the bottom surface. At least one fastening means extends through the hole and removably fastens the block member to the faucet shaft. A handle member comprises a plate having a bottom side and a top side. The bottom side has a well extending therein. The well has a diameter adapted for extendably positioning the top surface of the block member therein. The plate has an opening therein extending through the top side and into the well. A securing means extends through the opening and into the aperture for removably securing the plate to the block member.

In these respects, the faucet coupling device according to the present invention substantially departs from the conventional concepts and designs of the prior art, and in so doing provides an apparatus primarily developed for the purpose of securing a faucet handle to any faucet shaft.

SUMMARY OF THE INVENTION

In view of the foregoing disadvantages inherent in the known types of faucet handle coupling devices now present in the prior art, the present invention provides a new faucet coupling device construction wherein the same can be utilized for securing a faucet handle to any faucet shaft.

The general purpose of the present invention, which will be described subsequently in greater detail, is to provide a new faucet coupling device apparatus and method which has many of the advantages of the faucet handle coupling devices mentioned heretofore and many novel features that result in a new faucet coupling device which is not anticipated, rendered obvious, suggested, or even implied by any of the prior art faucet handle coupling devices, either alone or in any combination thereof.

To attain this, the present invention generally comprises a block member. The block member has a front surface, a back surface, a bottom surface, a top surface, a first side surface and a second side surface. The back surface has a bore extending therein. The front surface has an aperture extending therein and into the bore. The bore has a diameter greater than a diameter of the faucet shaft. The top surface has a first hole therein. The first hole extends into the bore and is orientated generally perpendicular to the bottom surface. At least one fastening means extends through the hole and removably fastens the block member to the faucet shaft. A handle member comprises a plate having a bottom side and a top side. The bottom side has a well extending therein. The well has a diameter adapted for extendably positioning the top surface of the block member therein. The plate has an opening therein extending through the top side and into the well. A securing means extends through the opening and into the aperture for removably securing the plate to the block member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new faucet coupling device apparatus and method which has many of the advantages of the faucet handle coupling devices mentioned heretofore and many novel features that result in a new faucet coupling device which is not anticipated, rendered obvious, suggested, or even implied by any of the prior art faucet handle coupling devices, either alone or in any combination thereof.

It is another object of the present invention to provide a new faucet coupling device which may be easily and efficiently manufactured and marketed.

It is a further object of the present invention to provide a new faucet coupling device which is of a durable and reliable construction.

An even further object of the present invention is to provide a new faucet coupling device which is susceptible of a low cost of manufacture with regard to both materials and labor, and which accordingly is then susceptible of low prices of sale to the consuming public, thereby making such faucet coupling device economically available to the buying public.

Still yet another object of the present invention is to provide a new faucet coupling device which provides in the apparatuses and methods of the prior art some of the advantages thereof, while simultaneously overcoming some of the disadvantages normally associated therewith.

Still another object of the present invention is to provide a new faucet coupling device for securing a faucet handle to any faucet shaft.

Yet another object of the present invention is to provide a new faucet coupling device which includes a block member. The block member has a front surface, a back surface, a bottom surface, a top surface, a first side surface and a second side surface. The back surface has a bore extending therein. The front surface has an aperture extending therein and into the bore. The bore has a diameter greater than a diameter of the faucet shaft. The top surface has a first hole therein. The first hole extends into the bore and is orientated generally perpendicular to the bottom surface. At least one fastening means extends through the hole and removably fastens the block member to the faucet shaft. A handle member comprises a plate having a bottom side and a top side. The bottom side has a well extending therein. The well has a diameter adapted for extendably positioning the top surface of the block member therein. The plate has an opening therein extending through the top side and into the well. A securing means extends through the opening and into the aperture for removably securing the plate to the block member.

Still yet another object of the present invention is to provide a new faucet coupling device that has block member for retrofitting a faucet handle to a faucet shaft without regard to the diameter of the faucet shaft.

Even still another object of the present invention is to provide a new faucet coupling device that has a covering member for covering the faucet shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
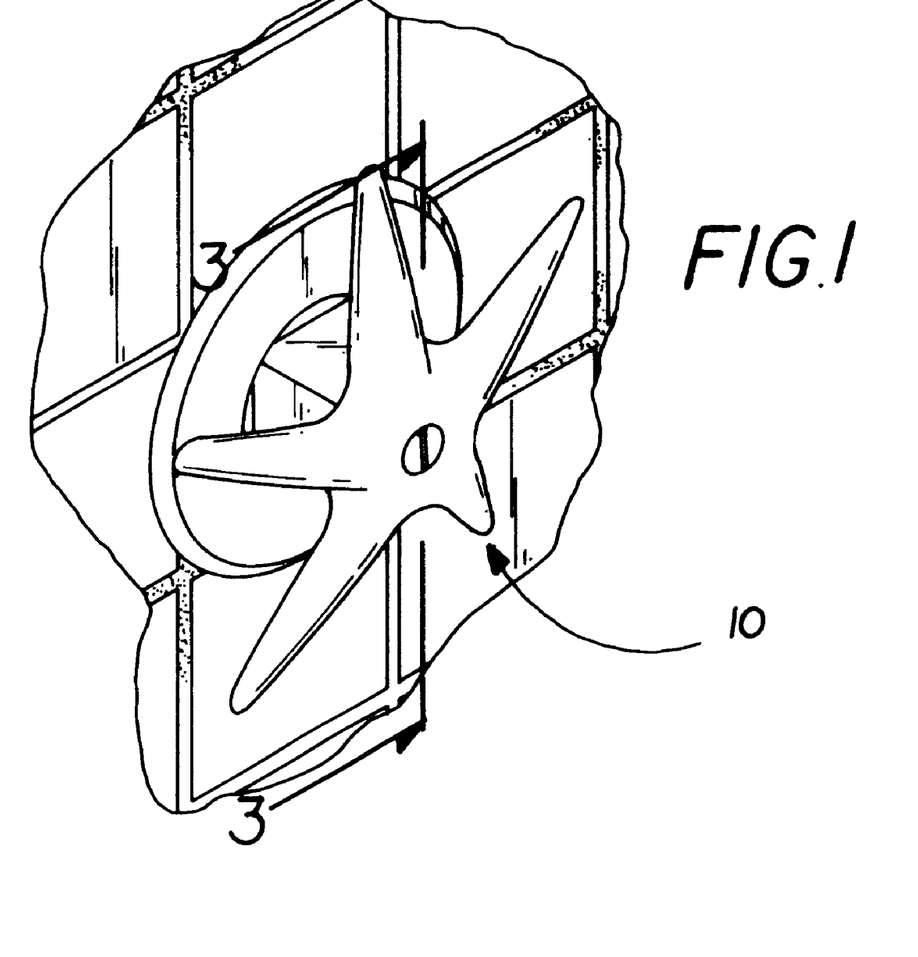
FIG. 1 is a schematic perspective view of a new faucet coupling device according to the present invention.
Figure 2:
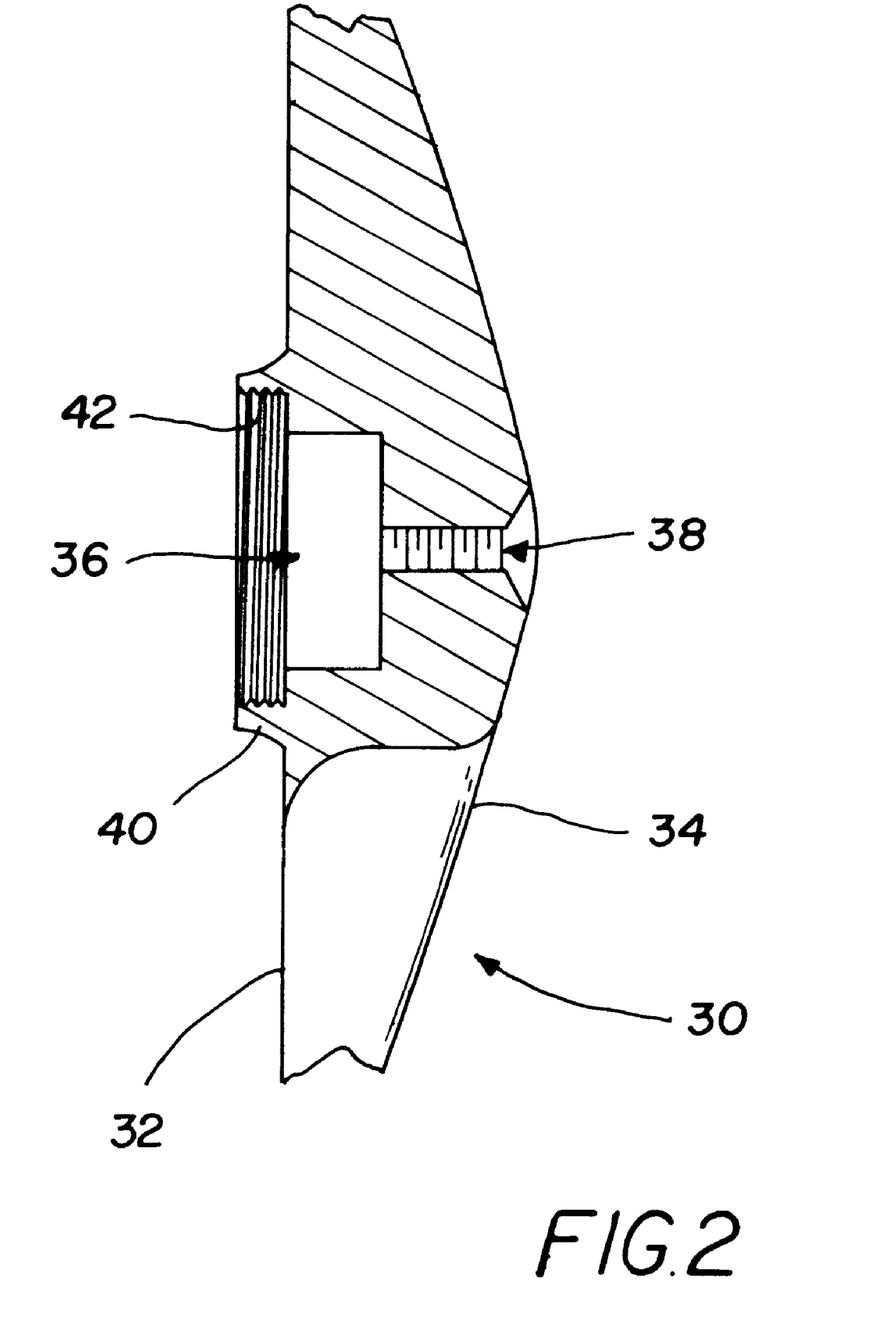
FIG. 2 is a schematic cross-sectional side of the handle member view of the present invention.
Figure 3:
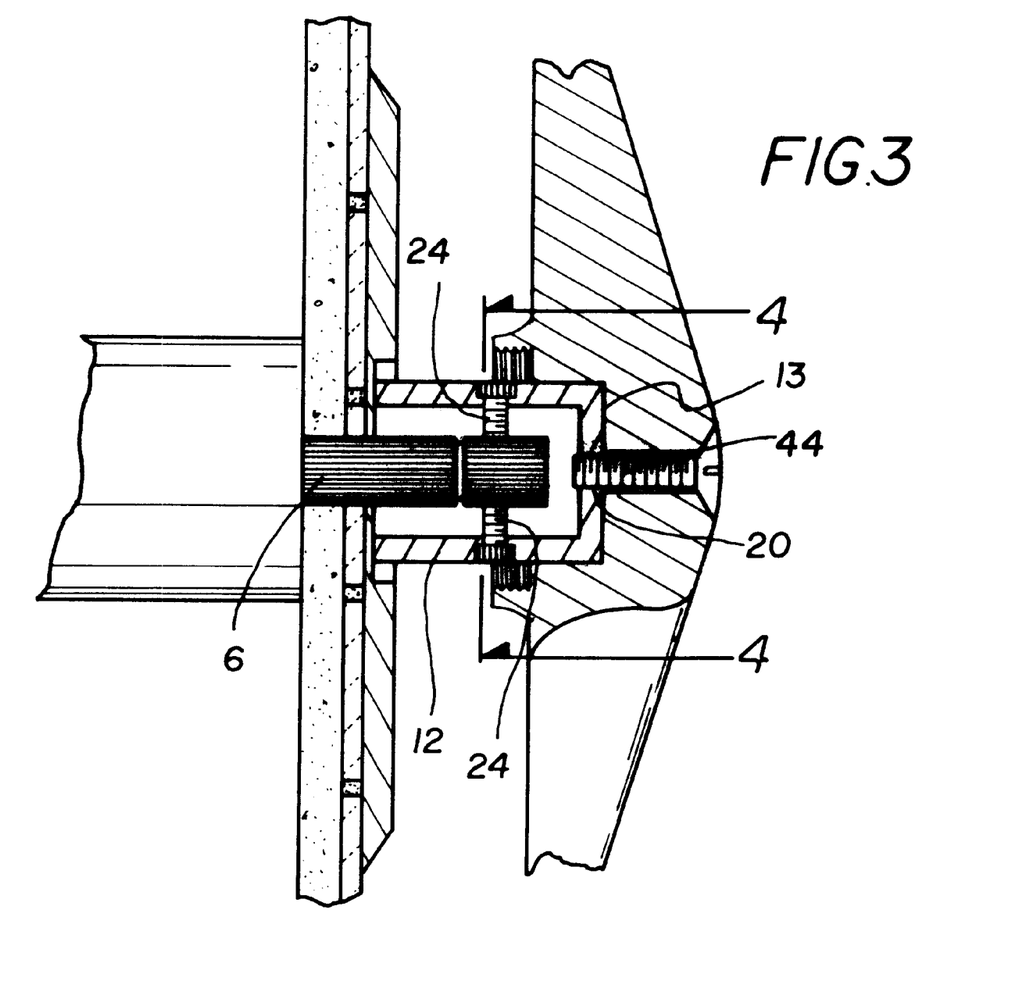
FIG. 3 is a schematic cross-sectional side view of the handle member on a faucet shaft of the present invention.
Figure 4:
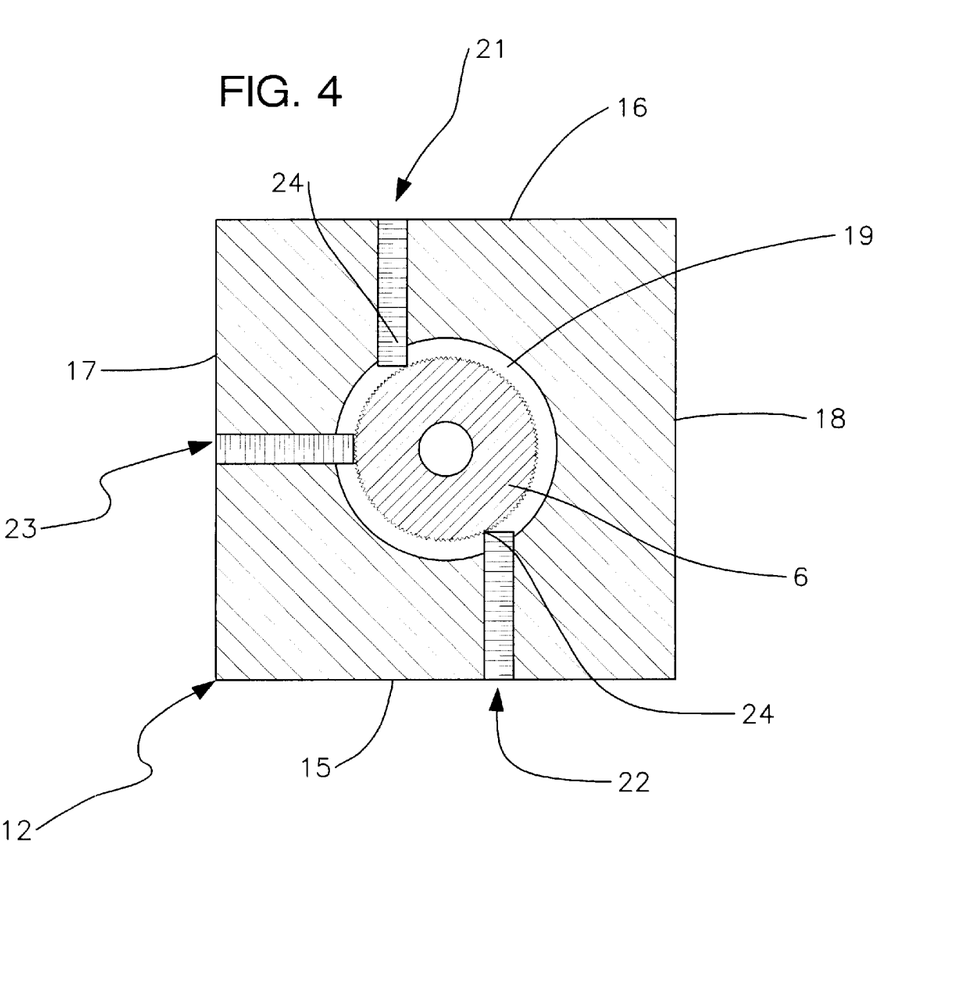
FIG. 4 is a schematic cross-sectional view of the block member taken along lines 4—4 of the present invention.
Figure 5:
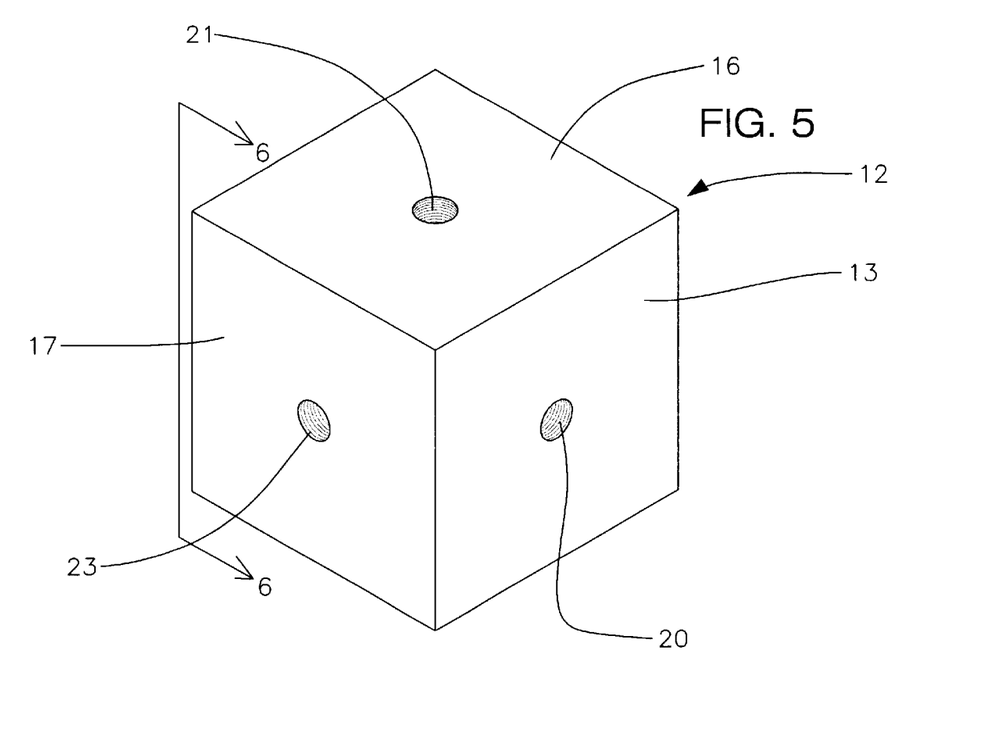
FIG. 5 is a schematic perspective view of the block member of the present invention.
Figure 6:
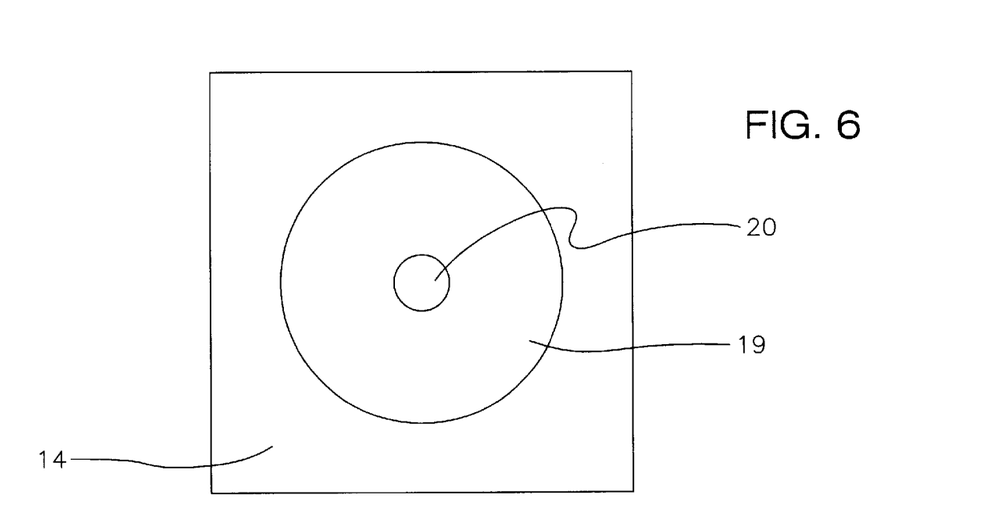
FIG. 6 is a schematic bottom view of the block member of the present invention.
Figure 7:
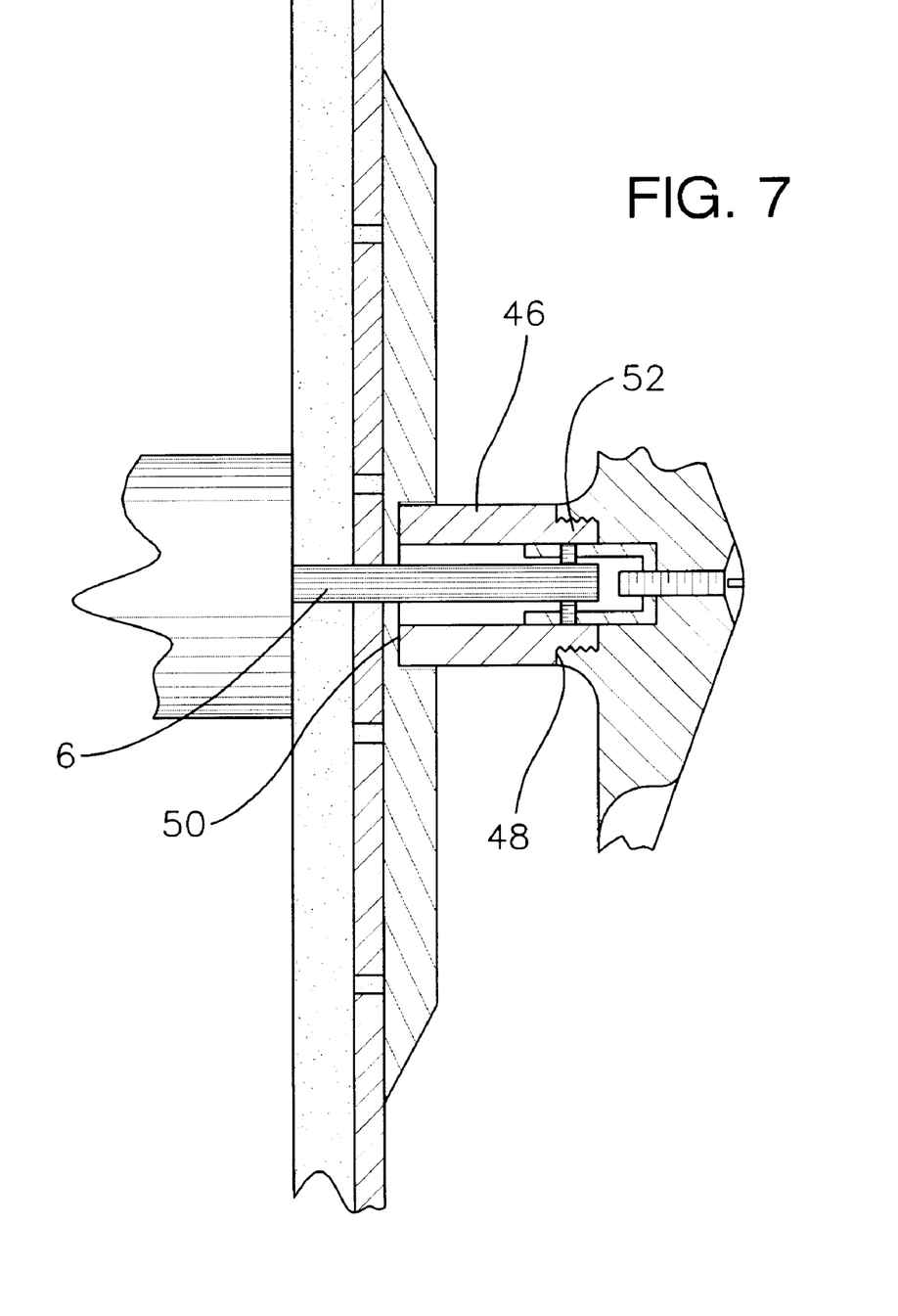
FIG. 7 is a schematic cross-sectional side view of the covering member of the present invention.
Figure 8:
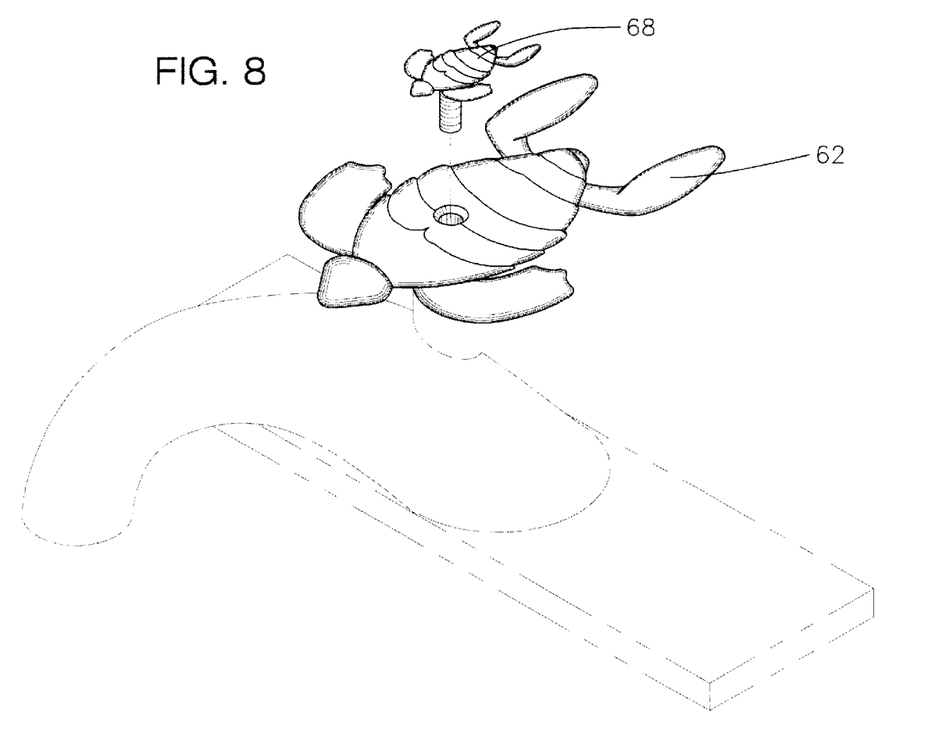
FIG. 8 is a schematic perspective view of the present invention.
Figure 9:
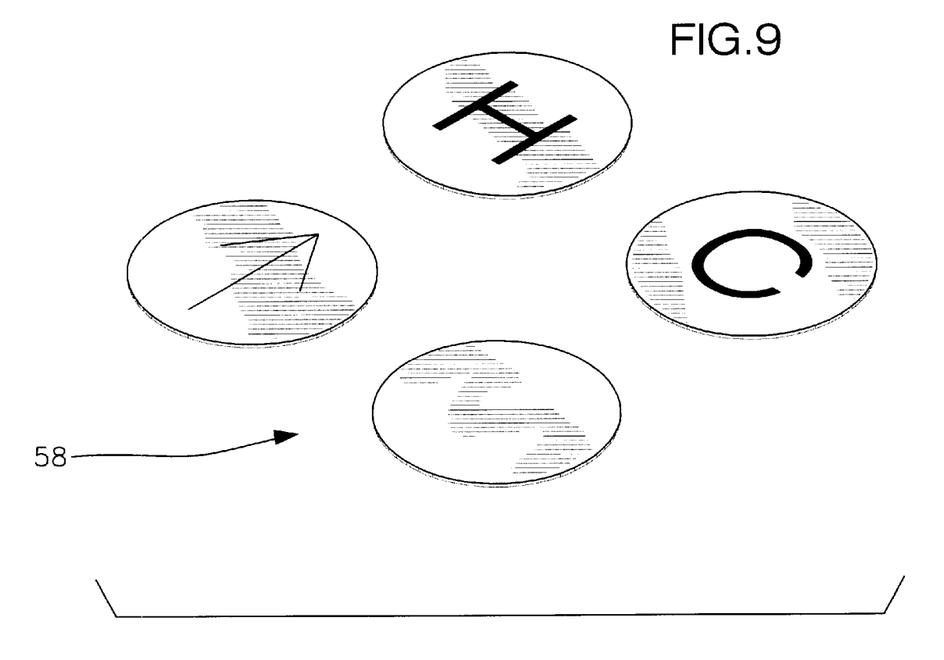
FIG. 9 is a schematic perspective view of the tab member of the present invention.
Figure 10:
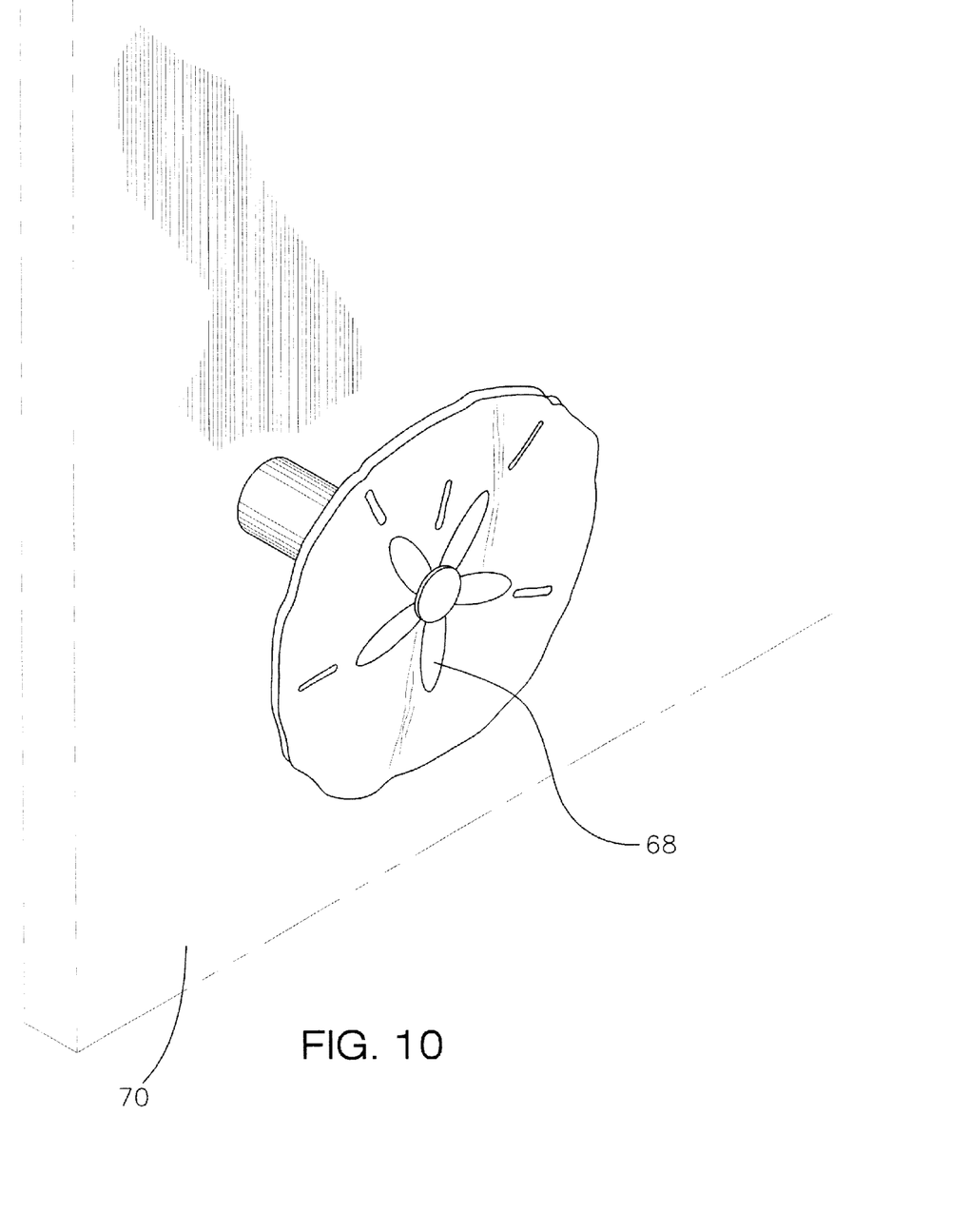
FIG. 10 is a schematic perspective view of the present invention.
Figure 11:
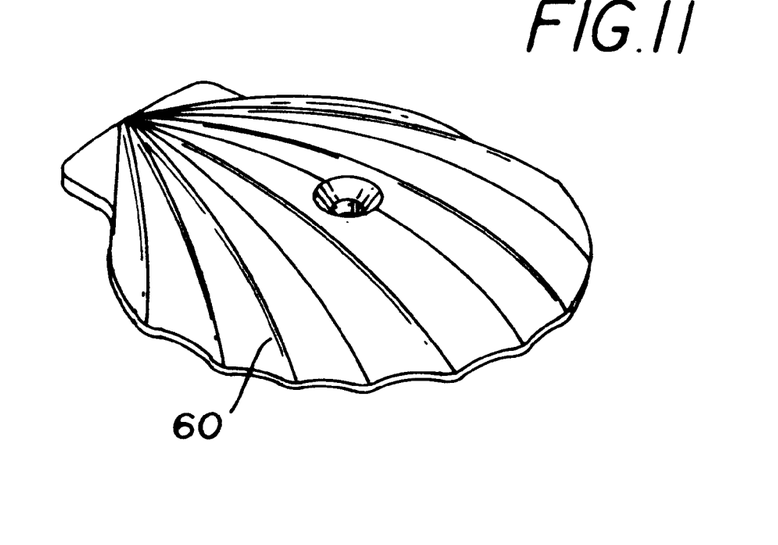
FIG. 11 is a schematic perspective top view of a handle member of the present invention.
Figure 12:
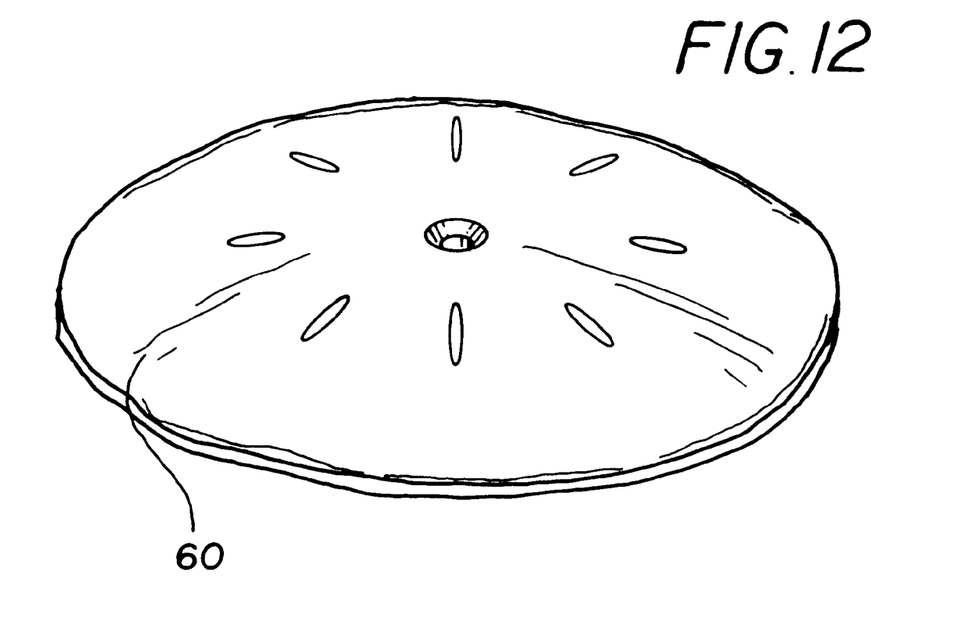
FIG. 12 is a schematic perspective top view of a handle member of the present invention.
Figure 13:
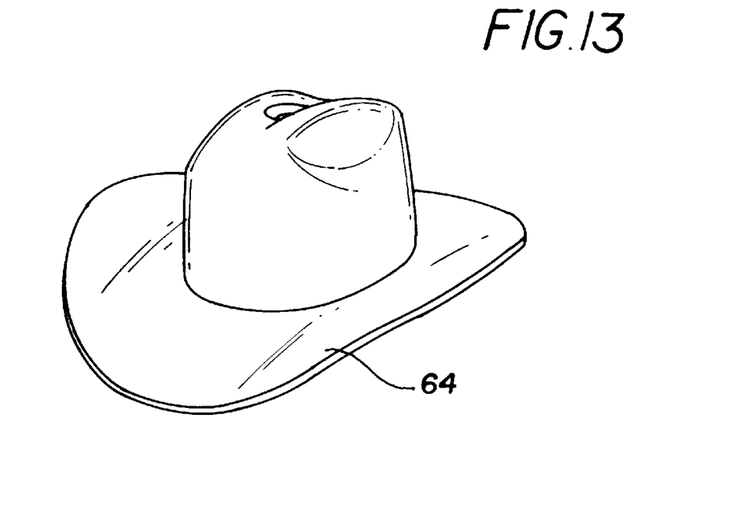
FIG. 13 is a schematic perspective top view of a handle member of the present invention.
Figure 14:
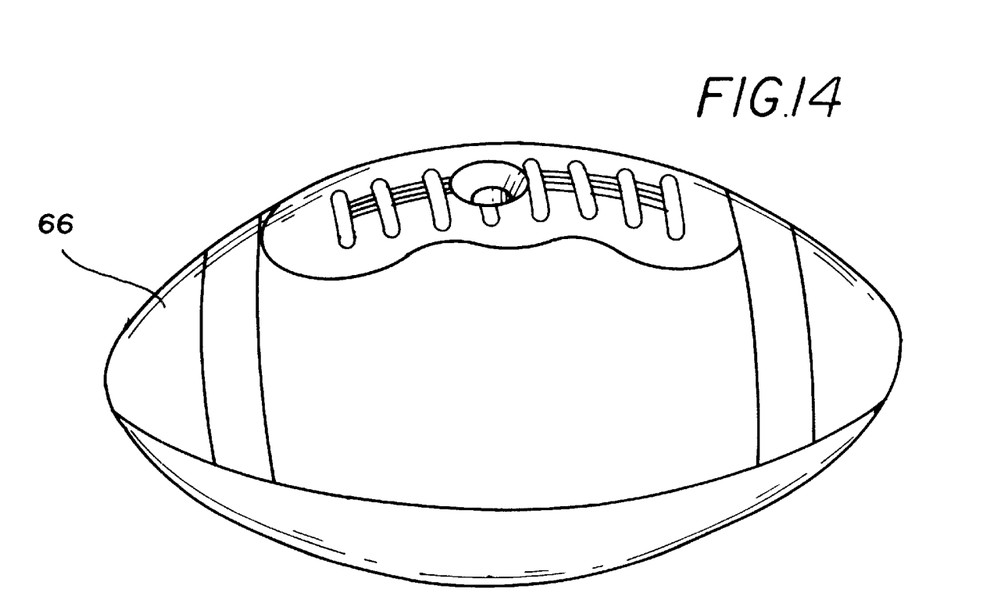
FIG. 14 is a schematic perspective top view of a handle member of the present invention.
Figure 15:
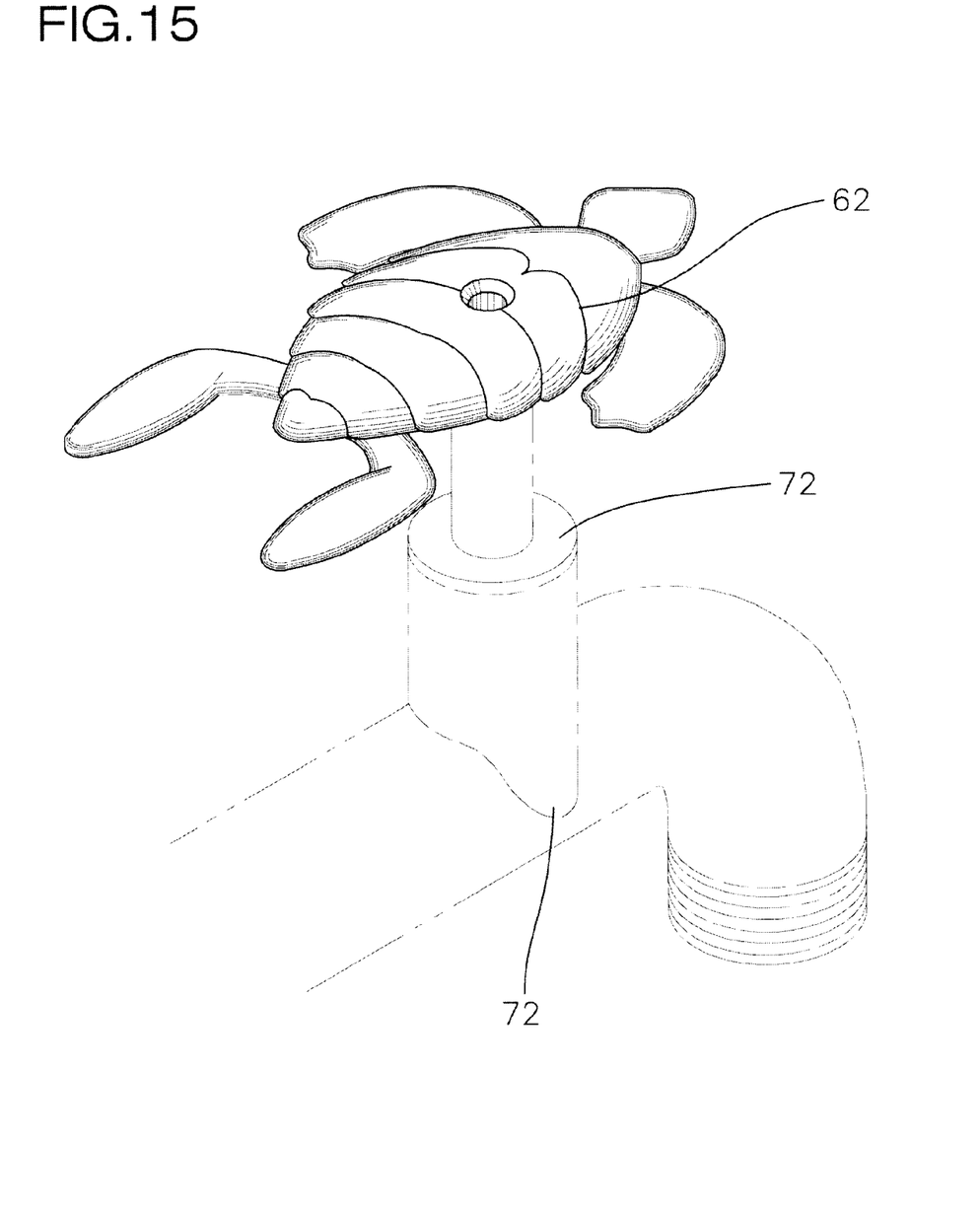
FIG. 15 is a schematic perspective view of the present invention.

With reference now to the drawings, and in particular to FIGS. 1 through 15 thereof, a new faucet coupling device embodying the principles and concepts of the present invention and generally designated by the reference numeral 10 will be described.

As best illustrated in FIGS. 1 through 15, the faucet coupling device 10 generally comprises a block member 12. The block member 12 has a front surface 13, a back surface 14, a bottom surface 15, a top surface 16, a first side surface 17 and a second side surface 18. Each of the surfaces has a generally rectangular shape. The back surface 14 has a bore 19 extending therein. The bore 19 extends to a point generally adjacent to the front surface 13. The front surface 13 has an aperture 20 extending therein and into the bore 19. The aperture 20 has a diameter less than a diameter of the bore 19. The bore 19 has, a diameter greater than a diameter of a faucet shaft 6 which will be extended into the bore 19. The top surface 16 has a first hole 21 therein. The first hole 21 extends into the bore 19. The first hole is orientated generally perpendicular to the bottom surface 15 and preferably positioned nearer the first side surface 17 than the second side surface 18. The bottom surface 15 has a second hole 22 extending therein. The second hole 22 extends into the bore 19 and is orientated generally perpendicular to the top surface 16. The second hole 22 is preferably positioned nearer the second side surface 18 than the first side surface 17. The first side surface 17 has a third hole 23 extending therein. The third hole 23 extends into the bore 19 and is orientated generally perpendicular to the second side surface 18. Each of the holes is ideally threaded.

A plurality of fastening means 24 removably fastens the block member 12 to the faucet shaft 6. The faucet shaft 6 is positioned in the bore 19. Each of the fastening means 24 extends into one of the holes and abuts the faucet shaft 6. Each of the fastening means 24 ideally comprises a screw. The first 21 and second 22 holes are generally used with conventional faucet shafts as is the one shown in FIG. 4. The third hole 23 is used for unconventional shafts for additional support.

Each of a plurality of handle members 30 comprises a plate having a bottom side 32 and a top side 34. The bottom side 32 has a well 36 extending therein. The well 36 has a diameter adapted for extendably positioning the front surface 13 of the block member 12 therein. The well 36 has a generally rectangular shape for receiving the block member 12. The handle member or plate 30 has an opening 38 therein extending through the top side 34 and into the well 36. The opening 38 is threaded. Ideally, an annular lip 40 is integrally coupled to and extends away from the bottom side 32 of the plate. The annular lip 40 extends around the well 36. The annular lip 40 has an inner surface 42 that is preferably threaded.

A securing means 44 secures the plate 30 to the block member 12. The securing means 44 extends through the opening 38 and into the aperture 20 in the block member 12. The securing means 44 preferably comprises a screw.

Preferably, a covering member 46 covers the faucet shaft 6. The covering member 46 comprises a tube having a first end 48 and a second end 50. The first end of the tube has an annular shoulder 52 integrally coupled thereto and extending away therefrom. The annular shoulder 52 has an outer surface which is threaded. The annular shoulder 52 has a shape and size adapted for releasably engaging the annular lip 40. The faucet shaft 6 is extended through the covering member 46 and the annular lip 40 is releasably engaged to the annular shoulder 52.

Ideally, a plurality of tab members 58 are included. The tab members 58 have generally planar front and back sides. The tab members 58 are placed over the securing means 44 in the opening to cover the securing means 44. The tab members 58 may have indicia thereon, such as to indicate hot or cold water.

The top surfaces 34 of the plates 30 may have a shape resembling nearly anything desired such as a sea-shells 60, turtle 62, cowboy hat 64 or football 66. The head 68 of the securing means 44 may also have the same shape as the plate, or other items such as flowers. The varying shapes allow a person to coordinate an entire room since the plates may be attached to anything needing a handle such as cabinet doors 70 or virtually anywhere a knob is required. The block member 12 is designed to attach to any shaped shaft for coupling a plate thereto. The invention may also be used on other types of faucets 72 as well such as those found in a garden or in a kitchen. Also, the shapes of the handle members lend themselves to easy grasping.

In use, the block member 12 is positioned over the faucet shaft 6 and coupled thereto. The covering member 46, if used, is then positioned over the faucet shaft 6. The covering member 46 may be long and thin for extending past any coverings to hide unsightly faucet shafts. The annular lip 40 is then coupled to the annular shoulder 52 and the securing means 44 secures the plate to the block member 12. The plate is then used as a conventional handle without the need of concern over size of the faucet shaft 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A universal faucet coupling device, said device being removably coupled to a faucet shaft, said device comprising:

a block member, said block member having a front surface, a back surface, a bottom surface, a top surface, a first side surface and a second side surface, said back surface having a bore extending therein, said front surface having an aperture extending therein and into said bore, said bore having a diameter greater than a diameter of the faucet shaft, said top surface having a first hole therein, said first hole extending into said bore, said first hole being orientated generally perpendicular to said bottom surface;

at least one fastening means for extending through said first hole and removably fastening said block member to the faucet shaft;

a handle member, said handle member generally comprising a plate having a bottom side and a top side, said bottom side having a well extending therein, said well having a diameter adapted for extendably positioning said front surface of said block member therein, said plate having an opening therein extending through said top side and into said well; and a securing means extending through said opening and into said aperture for removably securing said plate to said block member;

said bottom surface having a second hole extending therein, said second hole extending into said bore and being orientated generally perpendicular to said top surface; wherein another fastening means is extended through said second hole;

said block member having a block longitudinal axis said first hole having a first longitudinal axis, said second hole having a second longitudinal axis, said first longitudinal axis have a spaced relationship with said block longitudinal axis, said second longitudinal axis have a spaced relationship with said block longitudinal axis, said first longitudinal axis having a spaced relationship with said second longitudinal axis, said first fastening means contacting a first portion of the faucet shaft offset from a centerline of the faucet shaft, said second fastening means contacting a second portion of the faucet shaft offset from the centerline of the faucet shaft, said spaced relationships between said first longitudinal axis, said second longitudinal axis, and said block longitudinal axis facilitating offset contact by said first fastening means and said second fastening means whereby stripping of the faucet shaft from rotational forces through said block member and said first fastening means and said second fastening means is inhibited and flattening of the faucet shaft from tightening said first fastening means and said second fastening means is inhibited.

2. The universal faucet coupling device as in claim 1, further comprising:

a tab member, said tab member having a generally planar front side and back side, said tab member being positionable in said opening in said plate.

3. The universal faucet coupling device as in claim 1, wherein said block member further comprises:

said first side surface having a third hole extending therein, said third hole extending into said bore and being orientated generally perpendicular to said second side surface, said third hole being aligned with the center of the faucet shaft.

4. The universal faucet coupling device as in claim 1, further comprising:

an annular lip being integrally coupled to extending away from said bottom side of said plate, said annular lip extending around said well, said annular lip having an inner surface being threaded; and a covering member for covering said faucet shaft, said covering member comprising a tube having a first end and a second end, said first end of said tube having an annular shoulder integrally coupled thereto and extending away therefrom, said annular shoulder having an outer surface being threaded, said annular shoulder having a shape and size adapted for releasably engaging said annular lip, wherein said faucet shaft is extended through said covering member and said annular lip is releasably engaged to said annular shoulder.

5. The universal faucet coupling device as in claim 1, wherein each of said surfaces of said block member are rectangular and said well generally has rectangular shape.

6. The universal faucet coupling device as in claim 1, wherein each of said plates resembles a turtle, said securing means comprising a screw, said screw having a head resembling a turtle such that said opening is covered when said screw is positioned in said opening.

7. A universal faucet coupling device, said device being removably coupled to a faucet shaft, said device comprising:

a block member, said block member having a front surface, a back surface, a bottom surface, a top surface, a first side surface and a second side surface, each of said surfaces having a generally rectangular shape, said back surface having a bore extending therein, said bore extending to a point generally adjacent to said front surface, said front surface having an aperture extending therein and into said bore, said aperture having a diameter less than a diameter of said bore, said bore having a diameter greater than a diameter of the faucet shaft, said top surface having a first hole therein, said first hole extending into said bore, said first hole being orientated generally perpendicular to said bottom surface and positioned nearer said first side surface, said bottom surface having a second hole extending therein, said second hole extending into said bore and being orientated generally perpendicular to said top surface, said second hole being positioned nearer said second side surface, said first side surface having a third hole extending therein, said third hole.extending into said bore and being orientated generally perpendicular to said second side surface, each of said holes being threaded;

a plurality of fastening means for removably fastening said block member to said faucet shaft wherein said faucet shaft is positioned in said bore, each of said fastening means extending into one of said holes and abutting said faucet shaft, each of said fastening means comprising a screw;

said block member having a block longitudinal axis, said first hole having a first longitudinal axis, said second hole having a second longitudinal axis, said first longitudinal axis have a spaced relationship with said block longitudinal axis, said second longitudinal axis have a spaced relationship with said block longitudinal axis, said first longitudinal axis having a spaced relationship with said second longitudinal axis, said first fastening means contacting a first portion of the faucet shaft offset from a centerline of the faucet shaft, said second fastening means contacting a second portion of the faucet shaft offset from the centerline of the faucet shaft, said spaced relationships between said first longitudinal axis, said second longitudinal axis, and said block longitudinal axis facilitating offset contact by said first fastening means and said second fastening means whereby stripping of the faucet shaft from rotational forces through said block member and said first fastening means and said second fastening means is inhibited and flattening of the faucet shaft from tightening said first fastening means and said second fastening means is inhibited;

a handle member, said handle member including a plate having a bottom side and a top side, said bottom side having a well extending therein, said well having a diameter adapted for extendably positioning said front surface of said block member therein, said well having a generally rectangular shape, said plate having an opening therein extending through said top side and into said well, said opening being threaded, an annular lip being integrally coupled to extending away from said bottom side of said plate, said annular lip extending around said well, said annular lip having an inner surface being threaded;

a securing means for securing said plate to said block member, said securing means extending through said opening and into said aperture in said block member, said securing means comprising a screw; and a covering member for covering said faucet shaft, said covering member comprising a tube having a first end and a second end, said first end of said tube having an annular shoulder integrally coupled thereto and extending away therefrom, said annular shoulder having an outer surface being threaded, said annular shoulder having a shape and size adapted for releasably engaging said annular lip, wherein said faucet shaft is extended through said covering member and said annular lip is releasably engaged to said annular shoulder.

* * * * *